No. 780,281.

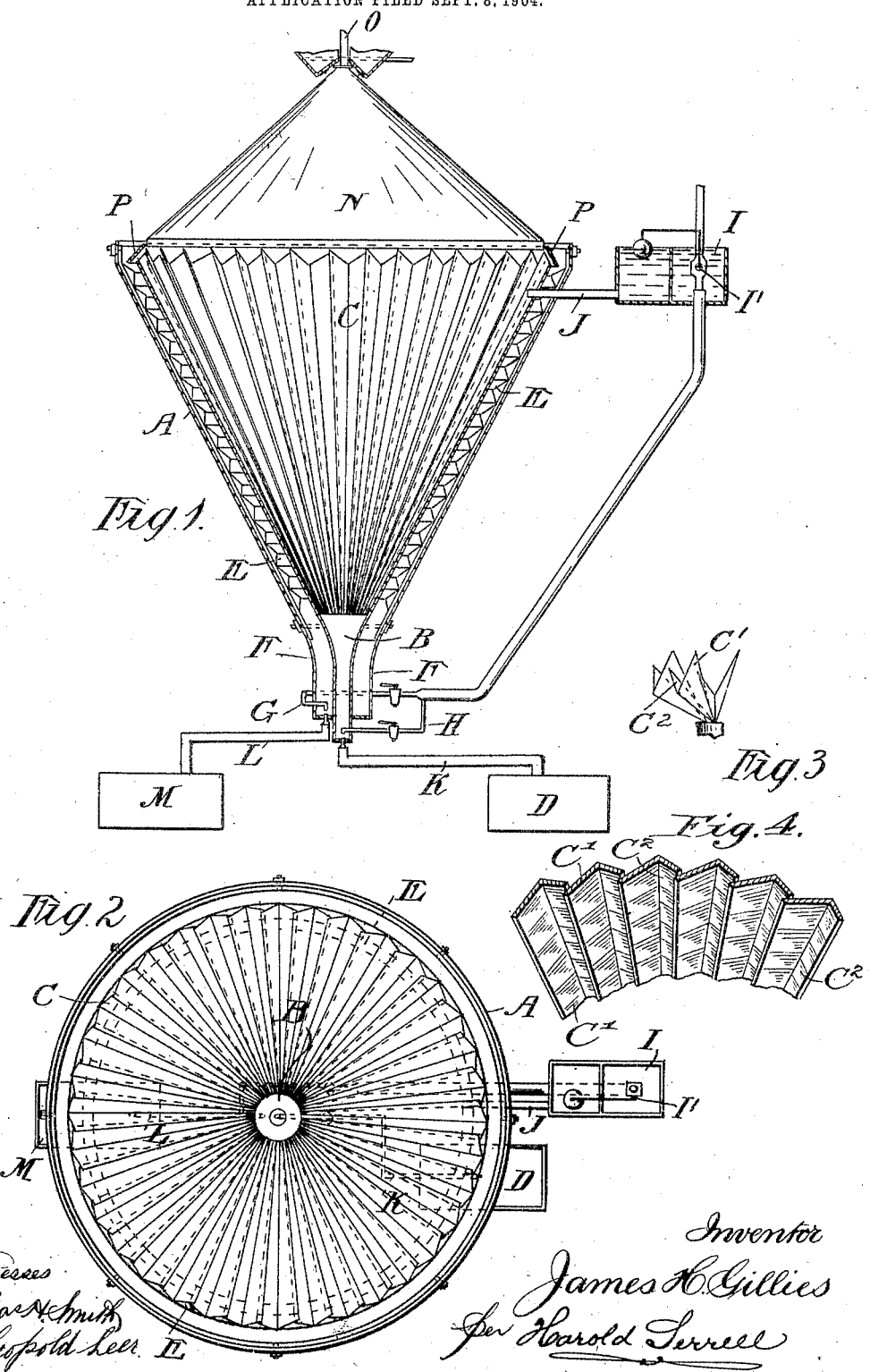

Patented January 17, 1905.

UNITED STATES PATENT OFFICE.

JAMES HYNDES GILLIES, OF MELBOURNE, VICTORIA, AUSTRALIA.

APPARATUS FOR RECOVERING ZINC OR OTHER SULFIDS FROM THEIR ORES.

SPECIFICATION forming part of Letters Patent No. 780,281, dated January 17, 1905.

Application filed September 8, 1904. Serial No. 223,721.

*To all whom it may concern:*

Be it known that I, JAMES HYNDES GILLIES, a subject of the King of Great Britain and Ireland, residing at No. 454 Collins street, Melbourne, in the State of Victoria, Australia, have invented certain new and useful Improvements in Apparatus for Recovering Zinc or other Sulfids from Their Ores, of which the following is a specification.

This invention has been devised to provide apparatus which will economically and efficiently win or recover the floating sulfids of zinc and other metals when the same are being treated by what is known as the "wet" or "chemical" process, in which acids or saline solutions are employed.

In order that my invention may be the better understood, reference may be made to the accompanying drawings, in which—

Figure 1 is a sectional elevation of my apparatus; Fig. 2, a plan view of same with baffle and support and hood removed, while Fig. 3 shows a detail of the apparatus; and Fig. 4 is a partial horizontal section through the catchment-chutes.

In the drawings, A represents a receptacle or receiver, preferably circular in shape and tapering to the bottom. The receptacle is provided with a central escapement-channel B, preferably also circular in shape, and communicating with such central escapement-channel is a complete system of inclined catchment-chutes C, each of such chutes formed somewhat in a V shape with one of the members, C', of the V slightly deeper than the other, C². (See Fig. 3.) The deeper member C' is arranged so that it slightly overlaps the shallower member C² of the next chute, but with a small distance between same. These chutes being radially arranged in the circular inclined arrangement are so set that when the ore is fed into the receptacle A (which latter contains the liquid chemical for its treatment) particles of pulverized ore will by reason of gaseous adhesion rise between the chutes C toward the surface in A and be caught over the lower edges C² of the V-shaped catchment-chutes. The chutes C are placed at an incline toward the center, so that the metallic particles (sulfids) will find their way along such chute downwardly to the central escapement-channel B, whence they will be run off to the collecting-vat D for further treatment by any approved process preparatory to smelting. The tailings containing the mineral sulfids agitates down the slope of the tapering vessel (about forty-five degrees) from step to step E and finds its way out at the bottom circular channel at F', where it meets incoming cold liquid supplied by inlet-pipe G. While the metallic particles are rising up to the catchment-chutes C, hereinbefore mentioned, the drossy matters may escape at the bottom in the following manner: The cold chemical liquid enters the vat at or near the bottom, so that the concentrates, on the one hand, from the channel B and the residual sand or drossy matter, on the other hand, in the channel F sink to the bottom and fall into the colder liquid continuously coming in by the respective branch pipes H and G, and such liquid and the concentrates and the residual sandy dross respectively escape through pipes at the bottom of the said receptacle and preferably directly under the inlet liquid-chemical pipes. The theory of this arrangement is that the heated liquid in the higher portions of the receptacle A is not being constantly reduced in temperature by the incoming liquids at H and G, but that as an equivalent amount of cold liquid is entering near the bottom to that running away at the bottom the level of the heated liquid in the receptacle A is not interfered with. It will thus be seen that practically speaking the incoming and outgoing cold liquid will not affect the chemical liquid which has been heated in the upper portion of the receptacle. In order to keep the liquid chemical at an approximately constant level, I employ a ball-and-cock arrangement in a small additional chamber I, the latter being in open connection with the liquid in the treating-vat A by means of pipe J. The ball governing a cock I' controls the feed of the cold chemical fluid from the supply-tank above to the inlet or inlets at the bottom, as aforesaid.

I would point out that the employment of the apparatus I have described will obviate to a considerable extent the necessity of using correspondingly-high degrees of temperature in the heating appliance in order to make good the loss of heat under present circumstances caused by the escape of hot chemical liquid from the bottom of the receptacle with the concentrates or residual sandy dross, respectively. As the heating of the chemical liquids to an unnecessarily high temperature under the present system causes the receptacle, and especially its heating portions, to be more easily attacked by the corrosive action of the said chemical fluids, it follows that it is desirable to employ such heating systems to the least possible degree of temperature.

Referring to the outlet-pipes K and L, respectively, at the bottom of the receptacle A, their openings leading from the receptacle should be of less diameter than their lower portions—that is to say, such openings should slightly dilate into pipes of larger diameter after they leave the said receptacle in order that any concentrates in the one or drossy matter in the other once entering into its respective pipe will not clog, but will, on the contrary, flow away the more freely as it passes along the said dilated or tapered portions into its main leadaway-pipe to its tank D or M.

Around the body of the receptacle or alternatively within its interior is arranged any approved heating device, so that the chemical liquid in the said vat may be heated to the degree of temperature necessary for its function. Said heating arrangement may be in some cases done by direct fire heat around the receptacle or pan or alternatively by steam jacket or coils.

Returning to the steps E, these can be formed by a separate plate of metal and act as a jacket within which steam heat may circulate to heat the chemical liquid in A. The function of the steps E is to cause the tailings to fall and be the more subject to the chemical action of the liquid in A.

N is a hood for distributing the supply of pulverized material in an even manner into the circular margin of A. The hood N is provided with an open leadaway pipe or flue O to convey away any steam that may collect in N from the workings of A.

A combination circular baffle and support P is placed so as to cover the top of the chutes, the function of said baffle and support being to continue the direction of the ore from the hood N to a point below the surface of the solution immediately above the outer circle of the first step. This device also forms an end to the radial chutes. The underneath surface of the baffle and support serves to direct the sulfids acted upon by the solution immediately beneath it to a point, so that when they fall again they are received into the chutes C and conveyed into the escapement-channel B.

Having now particularly described and ascertained the nature of my said invention and in what manner the same is to be performed, I declare that what I claim is—

1. In an apparatus for recovering zinc and other sulfids from their ores by the wet or chemical process and in combination, a receptacle, a series of radial overlapping inclined V-shaped catchment-chutes so placed as to guide the rising metallic gaseously-supported particles and on their falling receive and automatically discharge the same, said catchment-chutes being so arranged that each slightly overlaps its neighbor on one side, a central escapement-channel into which said particles fall, and means for removing said particles from said channel.

2. In an apparatus for recovering zinc and other sulfids from their ores by the wet or chemical process and in combination, a receptacle, a series of radial overlapping inclined V-shaped catchment-chutes, a central receiving-channel, a leadaway-pipe for the sulfids, an escapement for the drossy matters, a cold-liquid-inlet pipe placed above the same and an outer receptacle to which heat may be applied.

3. In an apparatus for recovering zinc and other sulfids from their ores by the wet or chemical process and in combination, a receptacle, a series of V-shaped overlapping inclined catchment-chutes, a central escapement for the sulfids, an escapement for the drossy matters at the bottom of said receptacle, and an inlet-pipe in close proximity to the bottom of said receptacle for the supply of cold liquid thereto.

4. In an apparatus for recovering zinc and other sulfids from their ores by the wet or chemical process and in combination, a receptacle to which heat is applied and having a series of steps on its interior, a series of V-shaped overlapping inclined catchment-chutes, a central escapement for the sulfids, an escapement for the drossy matters at the bottom of the said receptacle and an inlet-pipe in close proximity to the bottom of said receptacle for the supply of cold liquid thereto.

5. In an apparatus for recovering zinc and other sulfids from their ores by the wet or chemical process and in combination, a receptacle, a floating ball-and-cock arrangement governed by the liquid-level in the receptacle, means for supplying cold liquid through the medium of said ball-and-cock arrangement to the lower part of the said receptacle for leading away the drossy matters and the sulfids respectively to their destinations, a series of V-shaped overlapping inclined catchment-chutes, a series of steps behind which heat may be applied, a hood for supplying pulverized material into the circular margin of the receptacle, means for leading away any steam and gases that may arise during the working of the apparatus, and a circular baffle to assist in directing the pulverized ore from the hood to a point below the surface of the solution contained in the receptacle.

In testimony whereof I have signed my name to this specification in the presence of two subscribing witnesses.

JAMES HYNDES GILLIES.

Witnesses:
A, O. SACHSE,
A. HARKER.